US009527616B2

(12) United States Patent
Fahldieck

(10) Patent No.: US 9,527,616 B2
(45) Date of Patent: Dec. 27, 2016

(54) CONTAINER HANDLING MACHINE, SUCH AS A CONTAINER FILLING MACHINE FOR FILLING BOTTLES, CANS, OR SIMILAR CONTAINERS WITH A LIQUID BEVERAGE, AND A DEVICE FOR GRIPPING AND HOLDING CONTAINERS IN A CONTAINER HANDLING MACHINE

(71) Applicant: Andreas Fahldieck, Idar-Oberstein (DE)

(72) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/730,786

(22) Filed: Jun. 4, 2015

(65) Prior Publication Data

US 2015/0336699 A1    Nov. 26, 2015

Related U.S. Application Data

(63) Continuation-in-part of application No. PCT/EP2013/003460, filed on Nov. 16, 2013.

(30) Foreign Application Priority Data

Dec. 4, 2012   (DE) .................. 10 2012 111 763

(51) Int. Cl.
*B65G 29/00*   (2006.01)
*B65B 43/46*   (2006.01)
(Continued)

(52) U.S. Cl.
CPC ............. *B65B 43/46* (2013.01); *B65B 43/60* (2013.01); *B65G 47/847* (2013.01); *B65G 2201/0244* (2013.01)

(58) Field of Classification Search
CPC ..... B65G 47/84; B65G 47/846; B65G 47/847; B65G 47/842
(Continued)

(56) References Cited

U.S. PATENT DOCUMENTS 5,689,932 A * 11/1997 Peronek .................. B65B 43/60
53/201
5,778,633 A *  7/1998 Sweeny .................. B65B 43/60
53/201
(Continued)

FOREIGN PATENT DOCUMENTS

DE        29713510 U1    8/1998
DE    202006004641 U1    8/2007
(Continued)

OTHER PUBLICATIONS

German Office Action 10 2012 111 763.2, dated Apr. 30, 2013.
(Continued)

*Primary Examiner* — William R Harp
(74) *Attorney, Agent, or Firm* — Nils H. Ljungman & Associates

(57) ABSTRACT

A device for gripping and holding containers in a container handling machine. The device includes pivotable gripper arms to grip a container, a carrier body to support the gripper arms, and a transport element to connect the carrier body to the container handling machine. The carrier body comprises retaining elements to attach the carrier body to the transport element. Each of the retaining elements comprises a retaining structure. The transport element comprises retaining portions. Each of the retaining elements is designed to be resilient to hold the retaining structures in a position to permit engagement of the retaining structures with the retaining portions.

20 Claims, 6 Drawing Sheets

(51) Int. Cl.
*B65B 43/60* (2006.01)
*B65G 47/86* (2006.01)

(58) Field of Classification Search
USPC ....... 198/469.1, 474.1, 476.1, 478.1, 867.01, 198/867.02, 867.05
See application file for complete search history.

(56) References Cited

U.S. PATENT DOCUMENTS

| | | | |
|---|---|---|---|
| 8,151,544 B2* | 4/2012 | Till | B65G 47/847 53/167 |
| 8,225,923 B2* | 7/2012 | Fahldieck | B65G 29/00 198/470.1 |
| 8,360,492 B2* | 1/2013 | Winzinger | B65G 17/323 294/106 |
| 2015/0314966 A1* | 11/2015 | Fahldieck | B65G 47/847 294/199 |

FOREIGN PATENT DOCUMENTS

| | | |
|---|---|---|
| DE | 102008055620 A1 | 5/2010 |
| EP | 2138431 | 12/2009 |
| EP | 2279143 | 2/2011 |
| EP | 2295352 A2 | 3/2011 |
| WO | WO 2008106922 A1 | 9/2008 |
| WO | WO 2012107173 A1 | 8/2012 |

OTHER PUBLICATIONS

International Search Report, dated Jan. 31, 2014, and English translation thereof.

International Preliminary Report on Patentability and English translation thereof, dated Jun. 18, 2015.

* cited by examiner

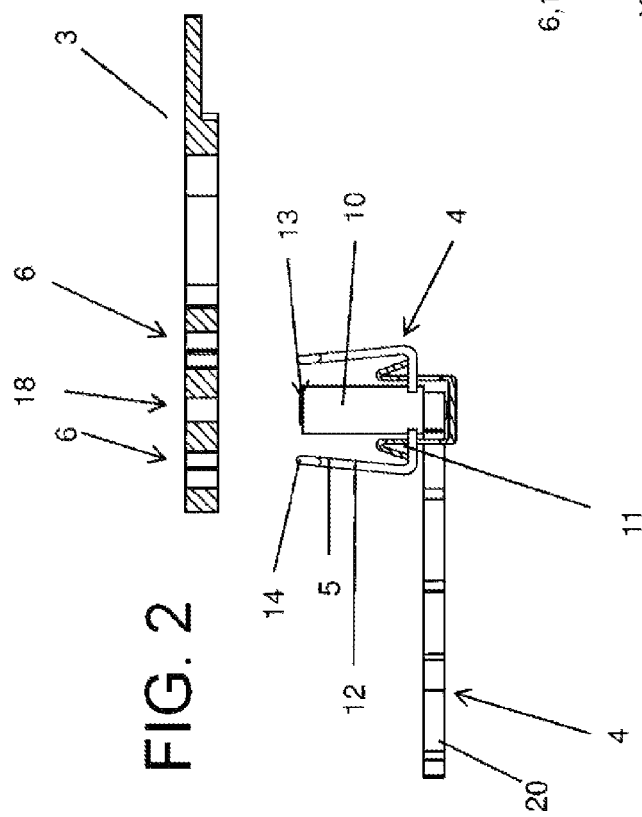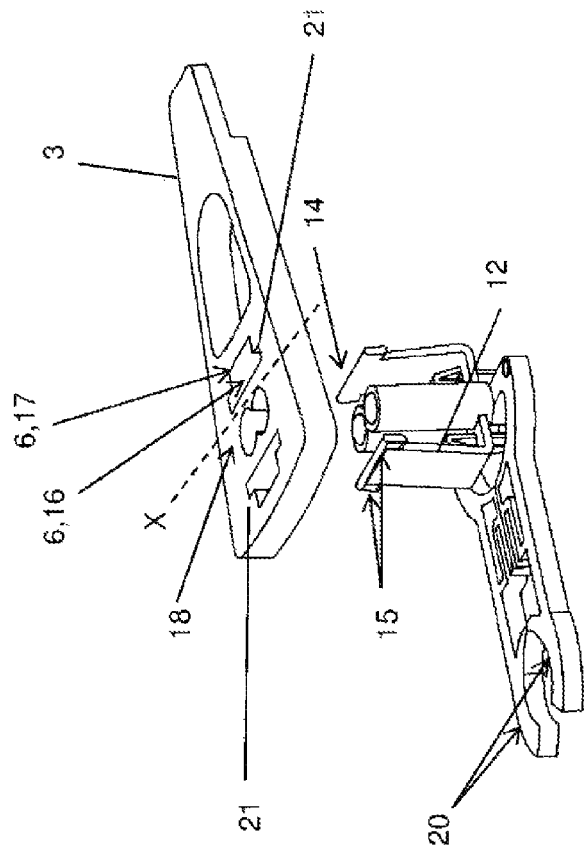

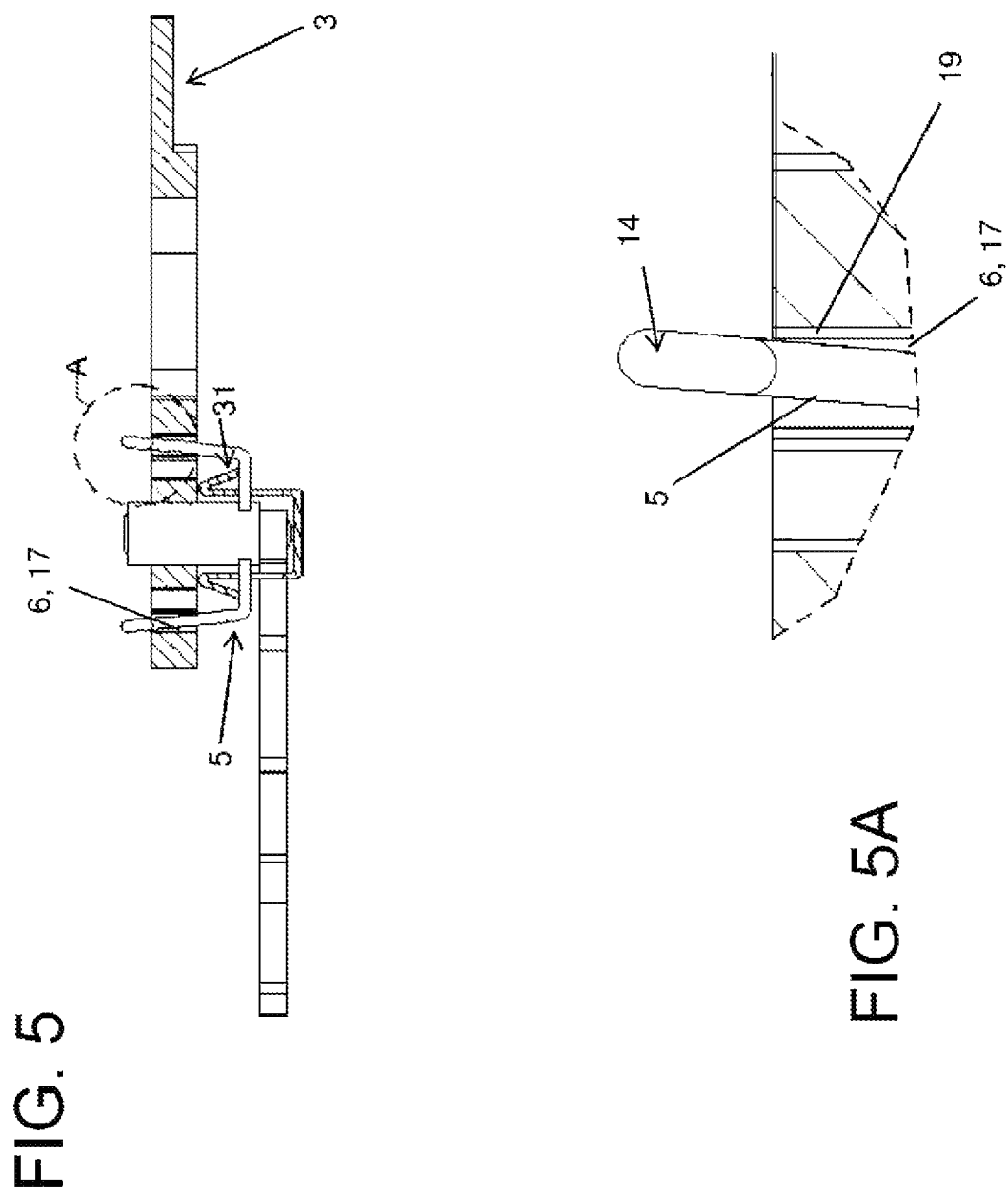

CONTAINER HANDLING MACHINE, SUCH AS A CONTAINER FILLING MACHINE FOR FILLING BOTTLES, CANS, OR SIMILAR CONTAINERS WITH A LIQUID BEVERAGE, AND A DEVICE FOR GRIPPING AND HOLDING CONTAINERS IN A CONTAINER HANDLING MACHINE

CONTINUING APPLICATION DATA

This application is a Continuation-In-Part application of International Patent Application No. PCT/EP2013/003460, filed on Nov. 16, 2013, which claims priority from Federal Republic of Germany Patent Application No. 10 2012 111 763.2, filed on Dec. 4, 2012. International Patent Application No. PCT/EP2013/003460 was pending as of the filing date of this application. The United States was an elected state in International Patent Application No. PCT/EP2013/003460.

BACKGROUND

1. Technical Field

The present application relates to a container handling machine, such as a container filling machine for filling bottles, cans, or similar containers with a liquid beverage, and a device for gripping and holding containers in a container handling machine.

2. Background Information

Background information is for informational purposes only and does not necessarily admit that subsequently mentioned information and publications are prior art.

The present application relates to a device for gripping and holding containers, for example bottles, for example PET bottles, in a container treatment or handling machine. The gripping device may have a carrier body that can be attached to a transport element and may include spring-loaded gripper arms which can swivel thereon.

Container handling or treatment systems and machines may include such systems or machines as filling machines, labeling machines, inspection machines, or rinsing machines. The containers referred to above can, for example, be used as bottles for liquids, for example for drinks. The containers, such as bottles, can comprise a transparent or translucent material, for example glass or a translucent plastic such as PET. However it is also conceivable that the containers comprise other materials and can be filled with other filling materials.

With filling machines, for example, there is a wealth of solutions to guide and keep the bottles on their path through the machine. During this process, the bottles are usually partially rotated, but in any case they must be or should be guided and gripped securely. Some grippers, for example, may be disposed in a rotary conveyor in which pivoted gripper arms are provided on a carrier plate. These gripper arms may comprise, between their other ends lying opposite the gripping jaws, a spring or a compression spring which forces these gripper arms into the closed position. The bottles can be inserted through entry tapers at the front of the gripper arms by compressing the spring and pulled out again by the reverse process.

Some gripping and holding devices may comprise gripper arms that can be replaced inexpensively, simply and even possibly without the need or desire for tools. This replacement can possibly be achieved by positioning, between bearing ends of the gripper arms, a fixing element, with the bearing ends comprising an edge recess. By turning the gripper arms into an extreme open position after first relieving the spring tension, the gripper arms are released from their fixing and so can be removed easily and without the need or desire for tools. For attaching it to the transport element, the carrier body comprises deformable mounting lugs made from an elastic material, which mounting lugs bring about a clamping contact with fixing elements of the transport element. The fixing elements comprise flat heads or plain washers to stop the deformable mounting lugs from falling out.

OBJECT OR OBJECTS

It is an object of the present application to provide a device for gripping and holding which is mountable in its entirety and also demountable easily and without tools, and which will also essentially guarantee and/or promote a secure hold in one possible embodiment in the mounted state even in the presence of vibrations or similar adverse influences.

SUMMARY

This object may be achieved by a device for gripping and holding according to the present application, in which the carrier body comprises detent elements, and the transport element comprises corresponding counter detent elements, such that the carrier body can be locked with the carrier element in a so-called "force-form fit."

Further embodiments and possible applications are also described in the present application. The described and/or pictorially represented attributes whether alone or in any desired combination are fundamentally the subject matter of the present application independently of their synopsis in the claims or a retroactive application thereof. The content of the claims is also made an integral part of the description.

A "force-fit" connection, according to the present application, is a connection in which the mating parts can be separated both in and counter to the direction of the join without damage, and in which the mating parts lie against one another without the use of further measures. A clamped connection can be regarded as a force-fit connection of this nature. A "form-fit" connection, according to the present application, is a connection in which the mating parts cannot be separated both in and counter to the direction of the join without damage, and in which the mating parts lie against one another with the use of further measures. A riveted connection can be regarded as a form-fit connection in which the rivet must be or should be destroyed to release the connection. A "force-form fit" or "force-form fitting" connection, according to the present application, is a connection in which the mating parts can be separated from one another several times without destruction by intentionally applying a releasing force counter to the direction of the join, and without the further measure that is used to maintain the connection being destroyed. The mating parts can also be connected to one another again several times in the direction of the join by way of the further measure.

The present application enables the carrier body to be connected securely in position to the carrier element, it being possible to execute a tool-less replacement of the complete unit, i.e. the carrier body with elements thereon disposed, such as for example both gripper arms, in a single step. The device for gripping and holding can therefore be pre-assembled in its entirety and so be mounted on the transport element in a single piece adapted to the required and/or desired conditions (bottle size etc.).

In at least one possible embodiment of the present application, the carrier body comprises detent elements that are configured as spring bars and with the transport element comprising corresponding detent openings as counter detent elements. This allows the carrier body to be simply locked to the carrier element in a force-form fit so that the force-form fitting connection can be created by the detent partners.

It is beneficial for the purpose of the present application if a plurality of spring bars, in one possible embodiment two, are provided as detent elements and which are arranged facing one another and for example on a swivel mount of the device, with the spring bars being configured in an L shape and having a transverse bar and a vertical bar extending away from the latter at an angle. The vertical bar extends towards a head region of the swivel mount and is oriented with its head section towards the swivel mount; the vertical bar is disposed in one possible embodiment at an acute angle (less than or equal to ninety degrees) to the transverse bar.

In one possible embodiment of the present application, the detent element comprises overhangs on its head section, each of which extends beyond either side of the vertical bar.

In one possible embodiment of the present application, the counter detent elements are each executed as a detent opening which are executed correspondingly to the detent elements, i.e. to the spring bars. The desired effect is achieved if the detent openings comprise two partial openings of different widths and which directly merge one into the other, i.e. they are adjacent to one another. The width of a first partial opening is matched to the width of the head section with its lateral overhangs, whereas the second partial opening is narrower than the first partial opening and matched to the width of the vertical bar. The number of counter detent elements in the transport element may be matched to the number of detent elements, so, for example, with two detent elements, two counter detent elements are also provided.

The counter detent elements are in one possible embodiment disposed on the transport element and are arranged inversely relative to an axis of reflection such that the first partial openings are oriented to the axis of reflection. Between the two openings which lie opposite one another relative to the axis of reflection are possibly disposed receiving apertures for the swivel mounts. The axis of reflection can be designated as the centerline of the receiving apertures.

The embodiment and arrangement of the counter detent elements, i.e. of the detent openings, may be matched to the spring action of the detent elements. This means that the detent elements with their head section pressed together are guided through the first larger partial opening and deflected towards the swivel mount and so are pretensioned or further pretensioned. Once the head section is guided fully through the first larger partial opening, the vertical bar moves under spring force towards its initial position, the vertical bar being as it were relieved, in one possible embodiment partially relieved. The overhangs of the head section lie on the surface which limits the partial opening, as evident from the acting bending force of the spring bar. The vertical bars enter the second, smaller, i.e. narrower partial opening, with the overhangs of the head sections lying on the corresponding limiting surface regions of the second smaller partial opening and so moving with reduced kinetic energy towards the end wall which limits the second, smaller partial opening. This essentially ensures or promotes that there is sufficient clearance for adjustment. In this way it is possible to essentially guarantee or promote a play-free bearing in which the detent elements can be displaced within a certain range, that is, at least within the second smaller partial opening, and in which range they have enough space to be able to lie securely. The detent openings are in one possible embodiment configured in such a way that the vertical bars are not fully relieved, so that the vertical bars are pressed by spring force, i.e. necessarily or desirably, towards the wall i.e. towards the end wall of the second partial opening, and remain in this position. There must not or may not be actual contact between one of the vertical bars and the corresponding end wall or between both vertical bars and the end wall concerned.

In one possible embodiment of the present application, the overhangs in the region of the second smaller i.e. narrower partial opening overhang the side of the latter, so providing pull-out protection from the second partial opening. In other words, the vertical bar is retained securely in position, i.e. essentially in a form-fit, in the second smaller partial opening, on the one hand by spring force and on the other hand by the overhangs lying on the transport element.

In at least one possible embodiment of the present application, to release the detent connection, the detent elements must be or should be intentionally deflected by their head sections against the spring force and towards the swivel mount so as to move the head sections into the region of the first larger partial opening so that the respective head sections can be withdrawn out of the detent opening against the direction of the join.

The transport element can be configured as a segmental element which can be attached by its mounting end to a shaft of the container treatment machine to form a rotary conveyor. In one possible embodiment, each carrier body is associated with a dedicated transport element. However it is also usual for a plurality of carrier bodies to be mounted on a segmental element which can be configured as a cutaway in the shape of a semicircle, quadrant, eighth of a circle or sixteenth of a circle or even smaller, and such that a plurality of carrier bodies can be mounted on one segmental element. The segmental elements can be connectable to a shaft by way of a cap element and a central screw. In a possible embodiment the transport element can be configured as a one-piece disk element on which are arranged the counter detent elements which can be engaged in the detent elements of the carrier bodies. The disk element can comprise a central opening through which a connecting element can be guided and the necessary and/or desired connection made to the shaft. It is also possible to provide a cap element which lies against the disk element, with the cap element and the connecting element together creating the necessary and/or desired antirotational connection of the disk element to the shaft. Overall therefore, a rotary conveyor, i.e. star transporter, is possibly formed comprising a plurality of carrier bodies with gripper arms thereon arranged.

A force-form fitting connection is achieved by the present application when the carrier body is set into the transport element, whereby, as well as the detent connection, a pretension is achieved which increases the holding force and avoids, restricts, and/or minimizes play between the connected parts. Play between the connected parts does not arise or is minimized, even under load or in the presence of vibrations. The carrier body is formed in one possible embodiment from a plastic material and so can be replaced rapidly and in its entirety without the need and/or desire for tools. This is to make possible not just replacing carrier bodies when switching to other bottle sizes, but also in the event of a crash, as the rapid and simple demounting and mounting can achieve a rapid repair without the need and/or desire to enlist the aid of specially trained personnel with special tools, since the head sections simply have to be guided by force out of their secure position into the releasing position in the region of the first partial opening. In one possible embodiment, the carrier bodies with their associated elements are simple and easy to clean in an open design with few components, with the carrier body and/or its elements being executed as the weakest member and destroyed in the event of an overload, this being however possible and intentional because of the ability to replace it quickly and easily in the manner of a predetermined breaking point.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

FIGS. 2 and 2A show the device of FIG. 1 in a condition separated from the transport element;

FIGS. 5 and 5A show a possible embodiment of the device according to the present application.

DESCRIPTION OF EMBODIMENT OR EMBODIMENTS

Figure 1:
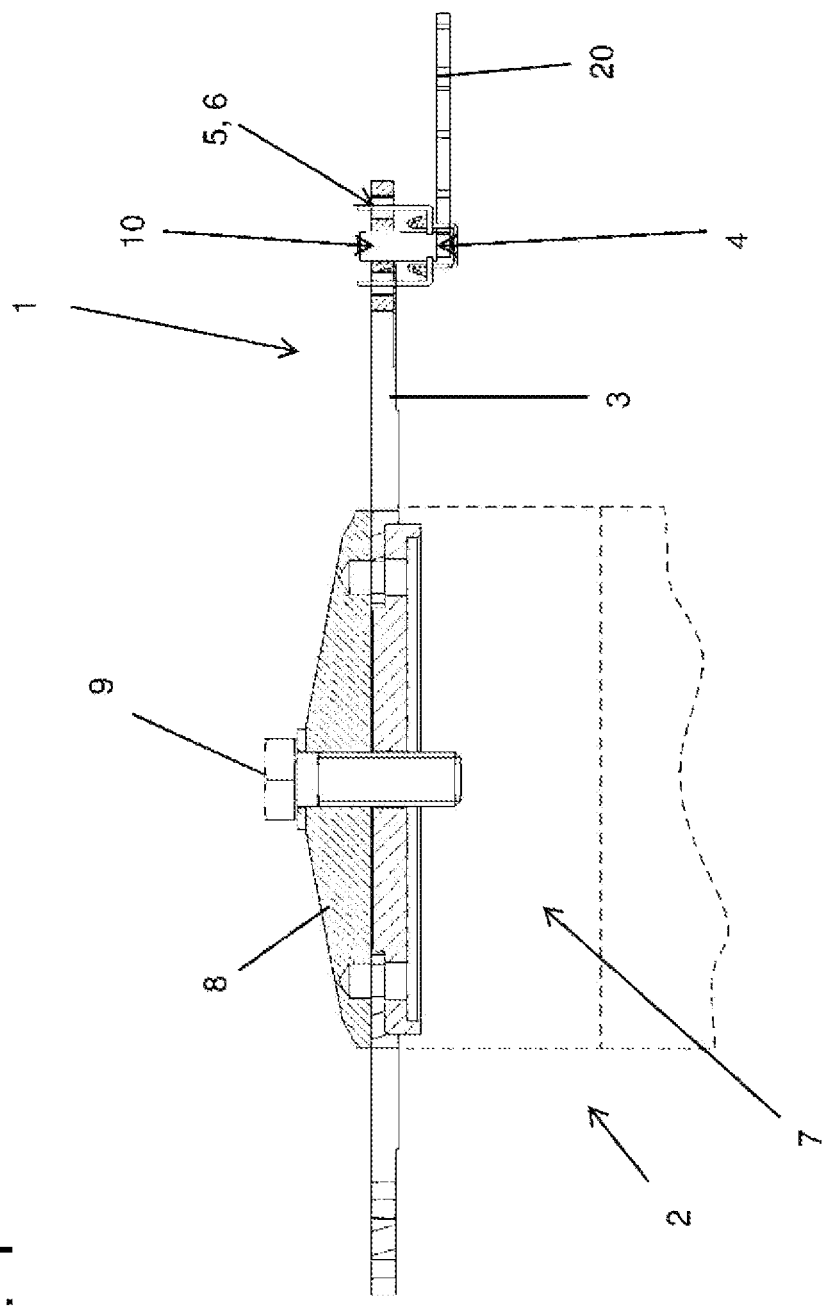
FIG. 1 shows a longitudinal section through a device for gripping and holding which is connected to a transport element.

In the different figures, identical parts are identified by the same reference character in each case, which is why they are generally described once. FIGS. 2 to 4B show different views, including a section view and perspective views.

Figure 6:
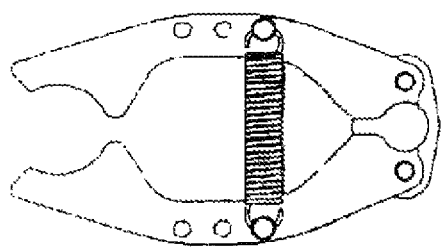
FIG. 6 shows an example of spring-loaded gripper arms.

FIG. 1 shows a device 1 for gripping and holding containers, in one possible embodiment bottles, in another possible embodiment PET bottles, in a container treatment or container handling machine 2 having carrier body 4 that can be attached to a transport element 3, as well as spring-loaded gripper arms 20 which can swivel thereon. An example of spring-loaded gripper arms, portions of which may or may not be incorporated into at least one possible embodiment disclosed herein, is shown in FIG. 6. Carrier body 4 comprises detent elements 5 and transport element 3 comprises corresponding counter detent elements 6 such that carrier body 4 can be connected to carrier element 3 in a force-form fit.

Container treatment machine 2 can be configured for example as a filling machine of which one shaft 7 can be seen. Transport element 3 can be connected to shaft 7. As can be seen in FIGS. 2 to 4B, transport element 3 is configurable as a segmental element, with each of the segments being connectable to shaft 7.

This is done using a cap element 8 which can be connected to shaft 7 by way of a screw 9 such that transport elements 3 are held securely in position and as it were a star transporter is formed. In a possible embodiment there is provision for a single transport element 3 to be configured as a circular disk which can be connected to shaft 7 by way of cap element 8 and screw 9 if required and/or desired. Other means of attachment are of course also conceivable and the star wheel or star transporter can of course have a different structure, for example an open structure with spoke-like carrier elements.

In FIGS. 2 and 2A, it can be seen that carrier body 4 comprises detent elements 5 that are configured as spring bars 5, with transport element 3 comprising corresponding detent openings 6 as counter detent elements 6.

A plurality of spring bars 5, two as depicted by way of example, are provided as detent elements 5 on carrier body 4 and are disposed opposite one another on a swivel mount 10.

Spring bars 5 are configured in an L shape and having a transverse bar 11 and a vertical bar 12 extending away from the latter at an angle. Vertical bar 12 extends towards a head region 13 of swivel mount 10 and is oriented with its head section 14 towards swivel mount 10; vertical bar 12 is disposed in one possible embodiment at an acute angle (less than or equal to ninety degrees) to transverse bar 11. The condition depicted in FIG. 2 shows the compressed position, with the angle being determined by the pressing force. In the tensioned or active condition, the angle of vertical bars 12 to transverse bars 11 is of central importance as explained below.

It can be seen that detent element 5 comprises overhangs 15 on its head section 14 which stand proud either side of vertical bar 12.

Since detent elements 5 are configured as spring bars, counter detent elements 6 are each configured as detent opening 6 corresponding to spring bars 5. Detent openings 6 comprise two partial openings 16 and 17 of different widths and which directly merge one into the other, i.e. they are adjacent to one another. The width of a first partial opening 16 is matched to the width of head section 14 with its lateral overhangs 15, whereas second partial opening 17 is narrower than first partial opening 16 and matched to the width of vertical bar 12.

Counter detent elements 6 are disposed on transport element 3 and are arranged inversely relative to an axis of reflection X such that first partial openings 16 are each oriented to axis of reflection X. Between the two detent openings 6 which are arranged lying opposite one another on axis of reflection X are in one possible embodiment disposed receiving apertures 18 for swivel mounts 10; axis of reflection X can be designated as the centerline of receiving apertures 18.

Figure 3:
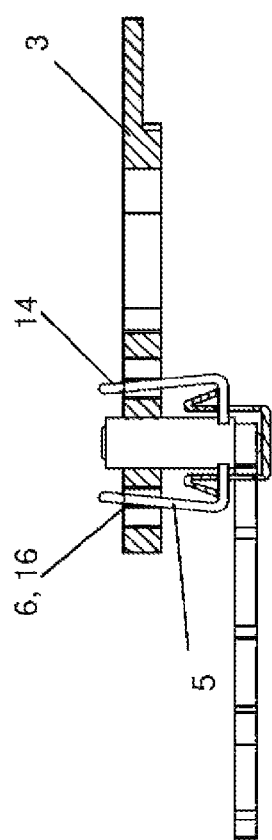
FIGS. 3 and 3A show the device of FIG. 2 in a first intermediate connecting or insertion step.
Figure 3A:
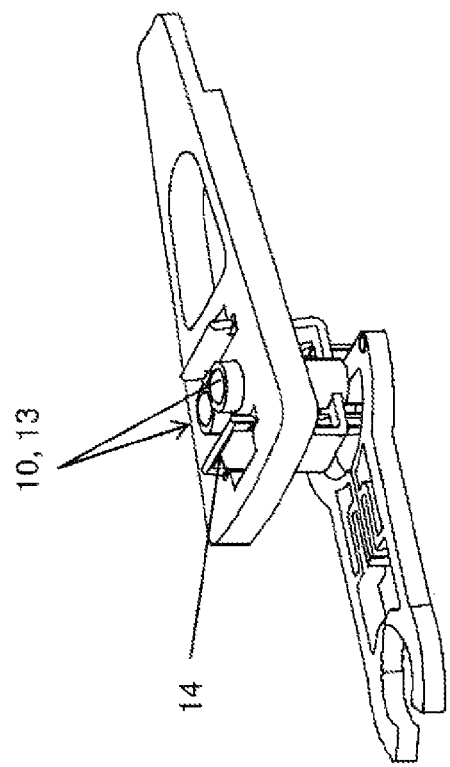

The embodiment and arrangement of counter detent elements 6, i.e. of detent openings 6, is matched to the spring action of detent elements 5. This means that detent elements 5 with their head section 14 pressed together are guided through first larger partial opening 16 and deflected towards swivel mount 10 and so pretensioned (FIGS. 3 and 3A).

Figure 4:
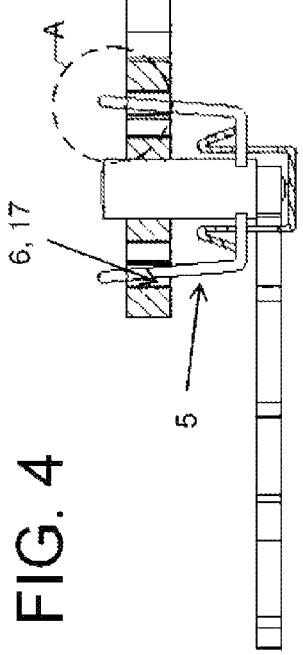
FIGS. 4, 4A, and 4B show the device of FIG. 1 in three views in the inserted or connected condition and additionally enlarged.
Figure 4B:
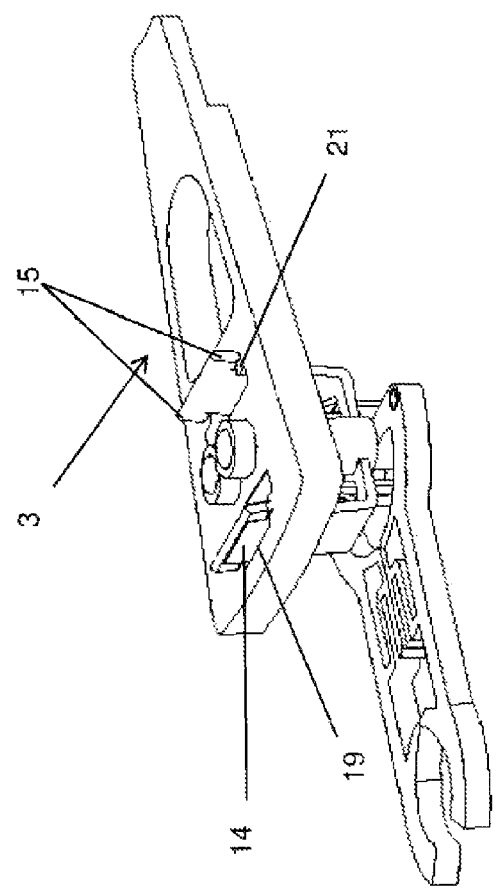

Once head section 14 is guided fully through first larger partial opening 16, vertical bar 12 moves under spring force towards its initial position, vertical bar 12 being at least partially relieved. Overhangs 15 of head sections 14 lie on the surface which limits partial opening 17, i.e. on limiting surface regions 21, as evident from the acting bending force of spring bar 5 (FIG. 4). Vertical bars 12 enter second, smaller, i.e. narrower partial opening 17, with overhangs 15 of head section 14 lying on the corresponding limiting surface region 21 of second smaller partial opening 17 and so moving with reduced kinetic energy towards wall 19, i.e. end wall 19, which limits second, smaller partial opening 17 (FIG. 4B). This essentially ensures or promotes that there is sufficient clearance for adjustment. In this way it is possible to essentially guarantee or promote a play-free bearing in which the detent elements 5 can be displaced within a certain range, that is, at least within the second smaller partial opening 17, and in which range they have enough space to be able to lie securely.

Figure 4A:
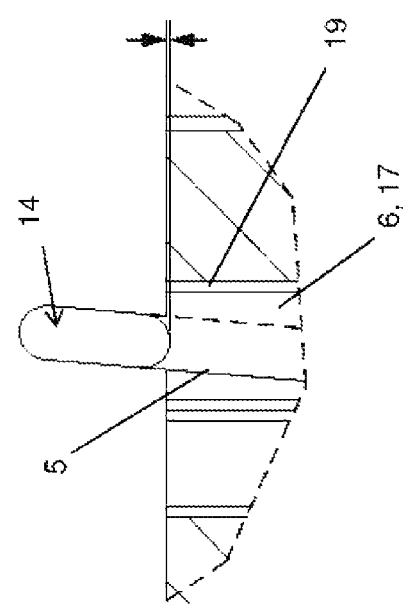

Detent openings 6 are configured in such a way that vertical bars 12 are not fully relieved, so that vertical bars 12 are pressed by spring force, i.e. necessarily or desirably, towards wall 19, i.e. towards end wall 19 of second partial opening 17, and remain in this position and so build up a tensile force which pulls carrier body 4 towards transport element 3 and/or presses it against the latter's underside. There may not necessarily be actual contact between one of the vertical bars 12 and the corresponding end wall 19 or between both vertical bars 12 and the end wall 19 concerned, such as shown in the close-up view in FIG. 4A.

According to at least one possible embodiment shown in FIGS. 5 and 5A, the vertical bars 12 press against and come in contact with the upper edge of the end wall 19. This contact between the vertical bars 12 and the end wall 19 locks or fits the vertical bars 12 securely in the second partial opening 17 so that there is very little or minimized or essentially no or effectively no play between the vertical bars 12 and the end wall 19, such that movement of the carrier body 4 with respect to the transport element 3 may be restricted, minimized, or eliminated. In addition, as shown in FIG. 5, the vertical bars 12 can be sized such that, upon connection or attachment of the carrier body 4 to the transport element 3, angled portions 31 of the carrier body 4 are brought into contact with the underside of the transport element 3. The contact between the angled portions 31 and the transport element 3 locks or fits the carrier body 4 against the transport element 3 so that there is very little or minimized or essentially no or effectively no play between the carrier body 4 and the transport element 3, such that movement of the carrier body 4 with respect to the transport element 3 may be restricted, minimized, or eliminated.

It can be seen that overhangs 15 in the region of second smaller i.e. narrower partial opening 17 overhang the side of the latter, so providing pull-out protection from second partial opening 19 (FIG. 4). In other words, vertical bar 12 is retained securely in position in second smaller partial opening 17, on the one hand by spring force and on the other hand by the overhangs 15 lying on transport element 3.

As can be seen, to release the detent connection, detent elements 5 must be or should be intentionally deflected by their head sections 14 against the spring force and towards swivel mount 10 so as to move head sections 14 into the region of first larger partial opening 16 so that respective head sections 14 can be withdrawn out of detent opening 5 against the direction of the join.

Carrier body 4 is formed for example from a plastic; the transport element can be formed from a metal. The other elements of the gripping and holding device, e.g. a gripping arm spring or other components, are not shown in FIGS. 1 to 4A-C to allow a clear depiction of the object of the present application with its detent and counter detent elements.

The present application relates to a gripper 4 for gripping and holding containers which can be secured to a transport element 3. Said gripper comprises catch elements 5 which can grip through corresponding counter catch elements 6 such that the gripper 4 can be locked with the transport element 3 in a positive fit.

According to at least one possible embodiment, a device for gripping and holding containers can be used in a container handling machine. The device, or the container gripping and holding device, includes pivotable gripper arms that can be used to grip a container, such as by the container neck or body in the case of bottles or similar containers, or by other portions of the container in the case of other containers, such as cans or jars or similar containers. The device could also include different gripping or holding structures, depending on the containers to be handled. For example, the device could utilize clamp arms or pinch arms, such as for holding bags or pouches. The device also includes a carrier body to support the gripper arms. A transport element connects the carrier body to a container handling machine, for example, a rotary container handling machine. The carrier body has retaining elements that are used to attach the carrier body to the transport element. Each of the retaining elements comprises a retaining structure, and the transport element comprises retaining portions. Each of the retaining portions is configured or structured or designed in such a manner as to engage with at least one of the retaining structures. In one possible embodiment, one retaining portion engages with only one of the retaining structures. In another possible embodiment, one retaining portion can engage with more than one of the retaining structures. This engagement resists detachment of the carrier body from the transport element upon a force being exerted that presses at least one of the retaining structures against at least one of the retaining portions. In other words, if a force, such as a gravitational force or a pulling force, is exerted, such as on or by or via the carrier body, the engagement of the retaining portion or portions and the retaining structure or structures acts to block or restrict the removal or detachment of the carrier body from the transport element. In such a scenario, at least one retaining structure is pressed against at least one retaining portion, and the at least one retaining portion physically or mechanically restrains or restricts the retaining structure, such that the carrier body cannot or essentially cannot be detached by movement in a direction along the direction of the force. In addition, each of the retaining elements is resilient to hold the retaining structures in a position to permit engagement of the retaining structures with the retaining portions. In other words, when the carrier body is connected or attached to the transport element, the retaining structures of the carrier body are positioned adjacent or next to or in contact with the retaining portions of the transport element. The retaining elements are resilient such that they hold the retaining structures in the desired position so that if a force, such as the gravitational or pulling force discussed above, is exerted to detach the carrier body, the retaining structures will be in position to engage with the retaining portions to prevent or resist detachment. However, since the retaining elements are resilient, they can be displaced or compressed by a user to move the retaining structures out of the desired position. Thus, only an intentional or desired detachment of the carrier body is permitted, such as for repair and/or replacement, and accidental or undesired detachment is prevented or resisted.

One feature or aspect of an embodiment is believed at the time of the filing of this patent application to possibly reside broadly in a device for gripping and holding containers in container treatment machines, having a carrier body 4 which can be attached to a transport element 3 and which comprises pivoted, spring-loaded gripper arms 20, wherein the carrier body 4 comprises detent elements 5 which can be locked in corresponding counter detent elements 6 of the transport element 3; the carrier body 4 can be locked with the transport element 3 in a form fit and additionally in a force fit by the bending stress of the spring arms, the carrier body 4 comprising detent elements 5 that are configured as spring bars 5.

Another feature or aspect of an embodiment is believed at the time of the filing of this patent application to possibly reside broadly in the device wherein the detent elements 5 are configured in an L shape with a transverse bar 11 and a vertical bar 12 and with their transverse bar 11 disposed on a swivel mount 10.

Yet another feature or aspect of an embodiment is believed at the time of the filing of this patent application to possibly reside broadly in the device wherein the detent element 5 is arranged with its vertical bar 12 at an angle to its transverse bar 11, with the vertical bar 12 being oriented at an angle with its head section 14 towards a head region 13.

Still another feature or aspect of an embodiment is believed at the time of the filing of this patent application to possibly reside broadly in the device wherein the detent element 5 comprises overhangs 15 on its head section 14, with the overhangs 15 standing proud to the side of a vertical bar 12 of the detent element 5.

A further feature or aspect of an embodiment is believed at the time of the filing of this patent application to possibly reside broadly in the device wherein the counter detent elements 6 are configured as detent openings 6.

Another feature or aspect of an embodiment is believed at the time of the filing of this patent application to possibly reside broadly in the device wherein the counter detent elements 6 comprise two partial openings 16, 17 of different widths which merge one into the other, with a first larger partial opening 16 matched to a width of a head section 14 with its overhangs 15 of the detent element 5, and with the second narrower partial opening 17 matched to a width of a vertical bar 12 of the detent element 5.

Yet another feature or aspect of an embodiment is believed at the time of the filing of this patent application to possibly reside broadly in the device wherein the counter detent elements 6 are arranged inversely relative to one another on the transport element 3.

Still another feature or aspect of an embodiment is believed at the time of the filing of this patent application to possibly reside broadly in the device wherein the transport element 3 is configured as a segmental element.

A further feature or aspect of an embodiment is believed at the time of the filing of this patent application to possibly reside broadly in the device wherein the transport element 3 is configured as a circular disk element.

One feature or aspect of an embodiment is believed at the time of the filing of this patent application to possibly reside broadly in a transport device in the form of a transporter or a container treatment machine, such as a filling machine or the like, comprising a plurality of device for gripping and holding containers 1 according to the present application, and which comprise counter detent elements 6 in which the detent elements 5 of the carrier bodies 4 can be locked, in one possible embodiment two counter detent elements 6 per device for gripping and holding 1 the carrier body 4.

Another feature or aspect of an embodiment is believed at the time of the filing of this patent application to possibly reside broadly in the transport device wherein the counter detent elements 6 are configured as detent openings through which the head regions 13, 14 of the vertical bars 12 can be guided and locked in that position.

Yet another feature or aspect of an embodiment is believed at the time of the filing of this patent application to possibly reside broadly in the transport device wherein the counter detent elements 6 are configured as detent openings which comprise at least two partial regions, that is, a first larger partial region 16 through which the head region 13, 14 of the vertical bar 12 can be guided, and a second smaller partial region 17 into which the vertical bar 12 can be moved in its mounted position, in one possible embodiment on the basis of the bending force; the head regions 13, 14 of the vertical bar 12 can be laid in the edge region of the smaller partial region 17, in one possible embodiment on that side of the transport element 3 which lies opposite the contact face of the carrier body 4.

Still another feature or aspect of an embodiment is believed at the time of the filing of this patent application to possibly reside broadly in the transport device wherein the end wall 19 of the counter detent element 6 is at such a distance away and the counter detent element is of such a size that the vertical bar 12 does not meet the end wall 19 in the direction of the bending force when in the mounted position.

A further feature or aspect of an embodiment is believed at the time of the filing of this patent application to possibly reside broadly in the transport device wherein the end wall 19 of two opposite counter elements 6 are dimensioned and/or spaced in such a way that at least one vertical bar 12 does not meet the associated end wall 19 in the direction of the bending force when in the mounted position.

Another feature or aspect of an embodiment is believed at the time of the filing of this patent application to possibly reside broadly in a container handling machine, such as a container filling machine for filling bottles, cans, or similar containers with a material, such as a liquid beverage, or a container closing machine for closing filled bottles, cans, or similar containers, or a container transport machine, such as a star wheel, for transporting bottles, cans, or similar containers, or a container treatment machine for treating bottles, cans, or similar containers, said container handling machine comprising: a support structure comprising a rotary support structure configured to rotate about an axis of rotation; a plurality of container gripping and holding devices configured to grip and hold containers comprising bottles, cans, or similar containers; said plurality of container gripping and holding devices being disposed on and connected to said support structure; each of said plurality of container gripping and holding devices comprising: pivotable gripper arms to grip a container; a carrier body to support said gripper arms; and a transport element to connect said carrier body to a container handling machine; said carrier body comprising retaining elements to attach said carrier body to said transport element; each of said retaining elements comprising a retaining structure; said transport element comprising retaining portions, each being configured to engage with at least one of said retaining structures, to thereby resist detachment of said carrier body from said transport element upon a force being exerted that presses at least one of said retaining structures against at least one of said retaining portions; and each of said retaining elements being resilient to hold said retaining structures in a position to permit engagement of said retaining structures with said retaining portions.

Yet another feature or aspect of an embodiment is believed at the time of the filing of this patent application to possibly reside broadly in the container handling machine, wherein: said gripper arms are spring-loaded; each of said retaining elements comprises a spring bar; said spring bar is bent at an angle or in a substantially L-shape; said spring bar comprises a first spring bar portion and a second spring bar portion disposed transverse to said first spring bar portion; said carrier body comprises a swivel mount configured to pivotably support said gripper arms; and said second spring bar portion is connected to and supported by said swivel mount.

Still another feature or aspect of an embodiment is believed at the time of the filing of this patent application to possibly reside broadly in the container handling machine, wherein: said swivel mount comprises a first end portion and a second end portion; said second spring bar portion is connected to said first end portion of said swivel mount; said first spring bar portion comprises a base portion joined to said second spring bar portion, a head portion, and an elongated body portion that connects said base portion and said head portion; and said first spring bar portion extends away from said second spring bar portion, such that said head portion of said first spring bar portion is disposed adjacent said second end portion of said swivel mount.

A further feature or aspect of an embodiment is believed at the time of the filing of this patent application to possibly reside broadly in the container handling machine, wherein: each of said retaining structures forms part of said head portion of its second spring bar portion; each of said retaining structures extends transverse to and projects beyond said body portion of its second spring bar portion in the form of an overhang; and said transport element comprises openings through which said second spring bar portions of said spring bars can be inserted.

Another feature or aspect of an embodiment is believed at the time of the filing of this patent application to possibly reside broadly in the container handling machine, wherein: each of said openings comprises a first, larger, region and a second, smaller, region having a smaller cross-section than said first region; said first region is sized to permit said head portion of said second spring bar portion to pass therethrough; said second region is sufficiently wide to permit said body portion of said second spring bar portion to be moved therein, but sufficiently narrow to prevent said head portion of said second spring bar portion to be moved therein; and said retaining portions of said carrier element are disposed at an edge of said second region, such that, upon said head portion of said second spring bar portion being inserted completely through said first region of said opening, and upon said body portion of said second spring bar portion moving into said second region by resilient force of said second spring bar portion, said retaining structures are disposed adjacent or in contact with said retaining portions.

Yet another feature or aspect of an embodiment is believed at the time of the filing of this patent application to possibly reside broadly in a device for gripping and holding containers in a container handling machine, said device comprising: pivotable gripper arms to grip a container; a carrier body to support said gripper arms; a transport element to connect said carrier body to a container handling machine; said carrier body comprising retaining elements to attach said carrier body to said transport element; each of said retaining elements comprising a retaining structure; said transport element comprising retaining portions, each being configured to engage with at least one of said retaining structures, to thereby resist detachment of said carrier body from said transport element upon a force being exerted that presses at least one of said retaining structures against at least one of said retaining portions; and each of said retaining elements being resilient to hold said retaining structures in a position to permit engagement of said retaining structures with said retaining portions.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, patent applications, patent publications, and other documents either incorporated by reference or not incorporated by reference.

All of the patents, patent applications, patent publications, and other documents, except for the exceptions indicated herein, which were cited in the German Office Action dated Apr. 30, 2013, and/or cited elsewhere, as well as the German Office Action document itself, are hereby incorporated by reference as if set forth in their entirety herein except for the exceptions indicated herein, as follows: DE102008055620 (A1), having the title "Vorrichtung zum Greifen von PET-Flaschen mit einem Schubkorper", published on May 20, 2010; DE29713510 (U1), having the title "Rotationsfüller", published on Aug. 27, 1998; EP2138431, having the title "Exchangeable grip element for transporting containers", published on Dec. 30, 2009; EP2138431, having the title "Exchangeable grip element for transporting containers", published on Dec. 30, 2009; EP2279143, having the title "DEVICE FOR GRIPPING AND HOLDING PET BOTTLES", published on Feb. 2, 2011; WO2008106922 (A1), having the title "DEVICE FOR MANIPULATING WORKPIECES", published on Sep. 12, 2008; WO 2012/107173, having the title "CONTAINER TRANSPORT DEVICE HAVING PLIABLE BOTTLE SUPPORTS", published on Aug. 16, 2012; and "Handbuch der Fertigungstechnik" by Günter Spur and Theodor Stöferle, having ISBN 3-446-12536-1.

All of the patents, patent applications, patent publications, and other documents, except for the exceptions indicated herein, which were cited in the International Search Report dated Jan. 31, 2014, and/or cited elsewhere, as well as the International Search Report document itself, are hereby incorporated by reference as if set forth in their entirety herein except for the exceptions indicated herein, as follows: EP2295352 (A2), having the title "Gripping unit for holding and moving items", published on Mar. 16, 2011; and DE202006004641 (U1), having the title "Greifelement", published on Aug. 9, 2007.

The corresponding foreign and international patent publication applications, namely, Federal Republic of Germany Patent Application No. 10 2012 111 763.2, filed on Dec. 4, 2012, having inventor Andreas FAHLDIECK, and DE-OS 10 2012 111 763.2 and DE-PS 10 2012 111 763.2, and International Application No. PCT/EP2013/003460, filed on Nov. 16, 2013, having WIPO Publication No. WO 2014/086460 and inventor Andreas FAHLDIECK, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/EP2013/003460 and German Patent Application 10 2012 111 763.2, is solely for the purposes of providing a basis of correction of any wording in the pages of the present application, which may have been mistranslated or misinterpreted by the translator, and to provide additional information relating to technical features of one or more embodiments, which information may not be completely disclosed in the wording in the pages of this application.

Statements made in the original foreign patent applications PCT/EP2013/003460 and DE 10 2012 111 763.2 from which this patent application claims priority which do not have to do with the correction of the translation in this patent application are not to be included in this patent application in the incorporation by reference.

Any statements about admissions of prior art in the original foreign patent applications PCT/EP2013/003460 and DE 10 2012 111 763.2 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, patent publications, and other documents, are not considered to be incorporated by reference herein for any of the patents, patent applications, patent publications, and other documents cited herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Device for gripping and holding
2 Container treatment machine
3 Transport element
4 Carrier body
5 Detent element/spring bar
6 Counter detent element/detent opening
7 Shaft
8 Cap element
9 Screw
10 Swivel mount
11 Transverse bar
12 Vertical bar
13 Head region of 10
14 Head section
15 Overhangs
16 First partial opening of 6
17 Second partial opening of 6
18 Receiving aperture
19 Wall/end wall
20 Gripper arms
21 Limiting surface regions of 17

What is claimed is:

1. A device for gripping and holding containers in a container handling machine, said device comprising:
pivotable gripper arms to grip a container;
a carrier body to support said gripper arms;
a transport element to connect said carrier body to a container handling machine;
said carrier body comprising retaining elements to attach said carrier body to said transport element;
each of said retaining elements comprising a retaining structure;
said transport element comprising retaining portions, each being configured to engage with at least one of said retaining structures, to thereby resist detachment of said carrier body from said transport element upon a force being exerted that presses at least one of said retaining structures against at least one of said retaining portions; and
each of said retaining elements being resilient to hold said retaining structures in a position to permit engagement of said retaining structures with said retaining portions.

2. A device for gripping and holding containers in container treatment machines, having a carrier body which can be attached to a transport element and which comprises pivoted, spring-loaded gripper arms, wherein the carrier body comprises detent elements that are configured as spring bars, which can be locked in corresponding counter detent elements of the transport element; the carrier body can be locked with the transport element in a form fit and additionally in a force fit by the bending stress of said spring bars.

3. The device of claim 2 wherein the detent elements are configured in an L shape with a transverse bar and a vertical bar and with their transverse bar disposed on a swivel mount.

4. The device of claim 3 wherein the detent element is arranged with its vertical bar at an angle to its transverse bar, with the vertical bar being oriented at an angle with its head section towards a head region.

5. The device of claim 4 wherein the detent element comprises overhangs on its head section, with the overhangs standing proud to the side of a vertical bar of the detent element.

6. The device of claim 5 wherein the counter detent elements are configured as detent openings.

7. The device of claim 6 wherein the counter detent elements comprise two partial openings of different widths which merge one into the other, with a first larger partial opening matched to a width of a head section with its overhangs of the detent element, and with the second narrower partial opening matched to a width of a vertical bar of the detent element.

8. The device of claim 7 wherein the counter detent elements are arranged inversely relative to one another on the transport element.

9. The device of claim 8 wherein the transport element is configured as a segmental element.

10. The device of claim 9 wherein the transport element is configured as a circular disk element.

11. The device of claim 2, in combination with a transporter or a container treatment machine, such as a filling machine or the like, which device comprises counter detent elements in which the detent elements of the carrier bodies can be locked, in particular two counter detent elements per device for gripping and holding the carrier body.

12. The device of claim 11 wherein the counter detent elements are configured as detent openings through which the head regions of the vertical bars can be guided and locked in that position.

13. The device of claim 12 wherein the counter detent elements are configured as detent openings which comprise at least two partial regions, that is, a first larger partial region through which the head region of the vertical bar can be guided, and a second smaller partial region into which the vertical bar can be moved in its mounted position, in particular on the basis of the bending force; the head regions of the vertical bar can be laid in the edge region of the smaller partial region, specifically on that side of the transport element which lies opposite a contact face of the carrier body.

14. The device of claim 13 wherein the end wall of the counter detent element is at such a distance away and the counter detent element is of such a size that the vertical bar does not meet the end wall in the direction of the bending force when in the mounted position.

15. The device of claim 14 wherein the end wall of two opposite counter elements are dimensioned and/or spaced in such a way that at least one vertical bar does not meet an associated end wall in the direction of the bending force when in the mounted position.

16. A container handling machine, such as a container filling machine for filling bottles, cans, or similar containers with a material, such as a liquid beverage, or a container closing machine for closing filled bottles, cans, or similar containers, or a container transport machine, such as a star wheel, for transporting bottles, cans, or similar containers, or a container treatment machine for treating bottles, cans, or similar containers, said container handling machine comprising:
  a support structure comprising a rotary support structure configured to rotate about an axis of rotation;
  a plurality of container gripping and holding devices configured to grip and hold containers comprising bottles, cans, or similar containers;
  said plurality of container gripping and holding devices being disposed on and connected to said support structure;
  each of said plurality of container gripping and holding devices comprising:
    pivotable gripper arms to grip a container;
    a carrier body to support said gripper arms; and
    a transport element to connect said carrier body to a container handling machine;
  said carrier body comprising retaining elements to attach said carrier body to said transport element;
  each of said retaining elements comprising a retaining structure;
  said transport element comprising retaining portions, each being configured to engage with at least one of said retaining structures, to thereby resist detachment of said carrier body from said transport element upon a force being exerted that presses at least one of said retaining structures against at least one of said retaining portions; and
  each of said retaining elements being resilient to hold said retaining structures in a position to permit engagement of said retaining structures with said retaining portions.

17. The container handling machine according to claim 16, wherein:
  said gripper arms are spring-loaded;
  each of said retaining elements comprises a spring bar;
  said spring bar is bent at an angle or in a substantially L-shape;
  said spring bar comprises a first spring bar portion and a second spring bar portion disposed transverse to said first spring bar portion;
  said carrier body comprises a swivel mount configured to pivotably support said gripper arms; and
  said second spring bar portion is connected to and supported by said swivel mount.

18. The container handling machine according to claim 17 wherein:
  said swivel mount comprises a first end portion and a second end portion;
  said second spring bar portion is connected to said first end portion of said swivel mount;
  said first spring bar portion comprises a base portion joined to said second spring bar portion, a head portion, and an elongated body portion that connects said base portion and said head portion; and
  said first spring bar portion extends away from said second spring bar portion, such that said head portion of said first spring bar portion is disposed adjacent said second end portion of said swivel mount.

19. The container handling machine according to claim 18, wherein:
  each of said retaining structures forms part of said head portion of its second spring bar portion;
  each of said retaining structures extends transverse to and projects beyond said body portion of its second spring bar portion in the form of an overhang; and
  said transport element comprises openings through which said second spring bar portions of said spring bars can be inserted.

20. The container handling machine according to claim 19, wherein:
  each of said openings comprises a first, larger, region and a second, smaller, region having a smaller cross-section than said first region;
  said first region is sized to permit said head portion of said second spring bar portion to pass therethrough;
  said second region is sufficiently wide to permit said body portion of said second spring bar portion to be moved therein, but sufficiently narrow to prevent said head portion of said second spring bar portion to be moved therein; and
  said retaining portions of said carrier element are disposed at an edge of said second region, such that, upon said head portion of said second spring bar portion being inserted completely through said first region of said opening, and upon said body portion of said second spring bar portion moving into said second region by resilient force of said second spring bar portion, said retaining structures are disposed adjacent or in contact with said retaining portions.

\* \* \* \* \*